Nov. 11, 1952  F. J. BLUME  2,617,618
ADJUSTABLE BRACKET
Original Filed Aug. 18, 1945
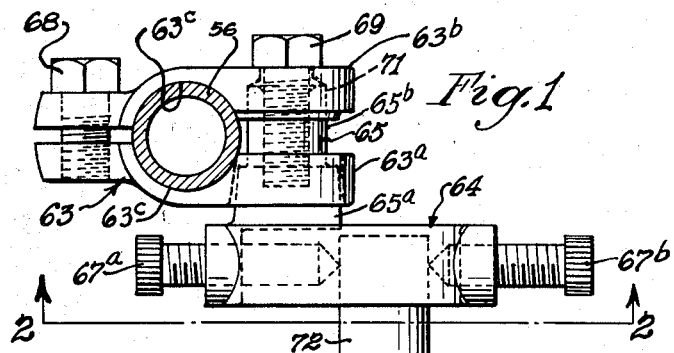
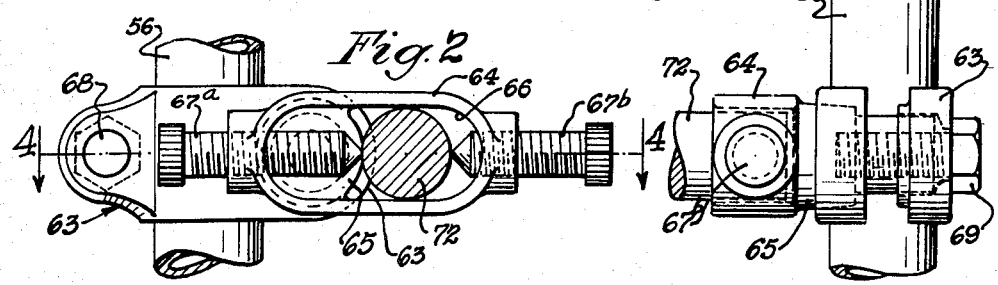
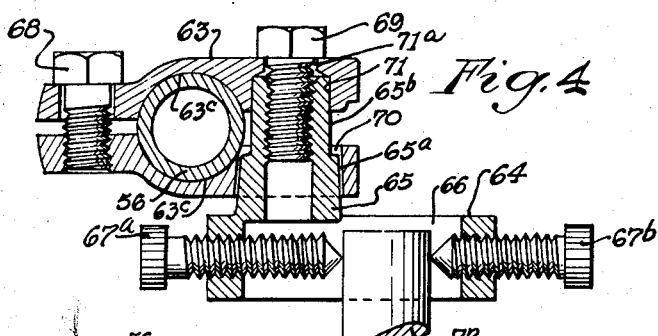
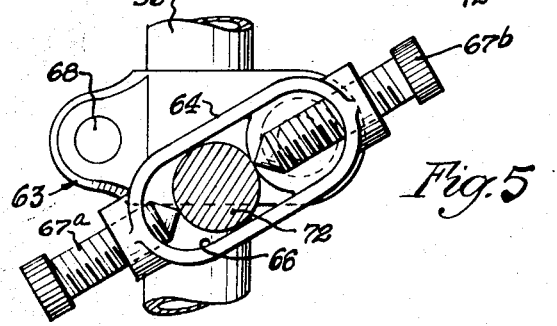
Inventor
Frank J. Blume
by Frank J. Schraeder Jr.
Attorney.

Patented Nov. 11, 1952

2,617,618

UNITED STATES PATENT OFFICE 2,617,618

ADJUSTABLE BRACKET

Frank Joseph Blume, Chicago, Ill.

Original application August 18, 1945, Serial No. 611,359, now Patent No. 2,472,805 dated June 14, 1949. Divided and this application June 13, 1949, Serial No. 98,775

1 Claim. (Cl. 248—229)

This application is a division of my application Serial No. 611,359 filed August 18, 1945, which matured into Patent No. 2,472,805 on June 14, 1949.

The present invention relates to a new and improved adjustable bracket for adjustably supporting any member which it is desired to support in an adjusted precise position from a stationary support. A plurality of the improved brackets may be used to support the opposite ends of an elongated rod or shaft with one of the brackets supporting an intermediate portion.

The improved adjustable brackets may be conveniently and desirably employed for adjustably supporting opposite ends of a roller shaft in precisely adjusted position from a cylindrical or tubular stationary support as exemplified in my Patent No. 2,472,805 where endless belts in multiple belt conveying systems are provided with drive and idler rollers which must be accurately positioned with reference to other rollers and stationary supports for same.

The various features of novelty whereby the present invention is characterized will hereinafter be pointed out with particularity in the claim, but, for a full understanding of the invention and its objects and advantages, reference may be had to the following detailed description taken in connection with the accompanying drawing, wherein:

Figure 1 is a plan view of an adjustable bracket embodying my invention.

Figure 2 is a side elevation of the bracket taken on line 2—2 of Fig. 1.

Figure 3 is an end elevation of the bracket as viewed from a point to the right of Fig. 2.

Figure 4 is a cross-section of the bracket taken on line 4—4 of Fig. 2.

Figure 5 is a view similar to that shown in Fig. 2 but showing the roller shaft supported in a different position, angularly and radially, relatively to the axis of the pivotally mounted stub shaft of the bracket.

The invention is shown exemplified in its adaptation as a bracket for supporting ends of a roller shaft which is designated by numeral 72.

As illustrated in the accompanying drawing, the adjustable bracket comprises a clamp member, generally designated by numeral 63, composed of a pair of similarly shaped clamping jaws 63$^a$ and 63$^b$ having intermediate their ends arcuate, oppositely disposed, seats 63$^c$ for engagement of a stationary support such as, for example, a cylindrical pipe 56. The jaws of the clamp member 63 may be secured to the pipe support 56 as by the tightening screw 68 which is loosely carried in one end of jaw 63$^b$ but has threaded connection in the corresponding end of jaw 63$^a$.

The opposite end of jaw 63$^a$ is provided with a round hole 70 which preferably is slightly frusto-conically faced, the inner end of the hole 70 being slightly smaller in diameter than its outer end as more clearly seen in Fig. 4. The corresponding end of jaw 63$^b$ is provided with a round hole 71 which is frusto-conically faced outwardly from the inner side of the jaw and such frusto-conical portion extends outwardly through the major distance of the hole 71 and terminates in an outer round opening 71$^a$ of a diameter smaller than the frusto-conical portion 71.

The bracket also includes an arm member generally designated by numeral 64 which is rotatably adjustable relatively to and carried by the clamp member 63 and which arm member includes a tubular stub shaft 65 which is formed integrally with the arm 64 which contains an elongated slot 66.

The tubular stub shaft 65 projects from one side of the slotted arm 64, near one end thereof, and at the outer side of same is formed with a pair of relatively axially offset frusto-conical faces 65$^a$ and 65$^b$ which are adapted to be seated in respectively the aligned frusto-conical holes 70 and 71 of the clamp jaws when the arm 64 is rotatably mounted in the clamp member 63. The slot 66 is only very slightly wider than the diameter of a cylindrical pipe, bar or shaft which it is to snugly support, and the element to be supported may obviously be of another cross-section other than that of a cylindrical element, however, as illustrated in the drawing, the element shown supported near one end of the slot 66 is a roller shaft 72.

Set screws 67$^a$ and 67$^b$ extend into the slot 66 through the opposite ends of the arm, their axes registering with the longitudinal axis of the slot 66. The length of the slot 66 is preferably more than twice the diameter of shaft 72 so that, with the end of shaft 72 entered in the slot 66 between the inner ends of the set screws 67$^a$ and 67$^b$, it may be adjusted therein radially relatively to the axis of the stub shaft 65 of the arm 64 through a distance greater than the diameter of the shaft. Therefore, after the clamp has been located and secured at approximately the desired elevated position on a stationary supporting rod or, as shown, on a pipe 56, and the clamp screw 68 has been tightened, the shaft 72 may then be raised or lowered and shifted lengthwise of the slot 66 while the arm 64 is permissibly rotatable about the axis of the stub shaft 65. This is accomplished by loosening the screw 69 that holds the arm member 64 secure and then rotating or swinging the arm member 64 up and down and by adjusting the screws 67$^a$ and 67$^b$ to shift the roller shaft 72 longitudinally of the slot 66 of the arm member 64 into the desired radial distance from the axis of the stub shaft 65.

It will be noted that the stub shaft 65 passes loosely through the opening 70 in the clamp member 63$^a$ so as not to interfere with the free action of the clamp, but is securely seated within the opening 71 in clamp member 63$^b$ when screw 69 is tightened. This permits the clamp to be shifted into the desired elevated position without disturbing the adjustment of the arm 64 and shaft 72 relatively to the vertical axis of the support 56. Thus the shaft 72 may be conveniently supported on the bracket 63 with its longitudinal axis positioned at a desired radial distance from, and angle relatively to, the axis of the stub shaft 65.

I claim:

An adjustable bracket adapted to support a shaft in adjusted position relatively to a cylindrical stationary support therefor comprising an arm having a longitudinally extending elongated slot adapted to receive therein an end portion of the shaft, set screws extending into said elongated slot through opposite ends of said arm having axes registering with the longitudinal axis of said slot adapted to secure said shaft in selectively adjusted position longitudinally of said slot, a clamp adapted to be secured to a cylindrical stationary support comprising a pair of similarly shaped oppositely disposed adjacent clamping jaws each having an arcuate seat whereby to embrace opposite sides of said stationary support, a headed screw extending within corresponding ends of said jaws having threaded engagement with one of said jaws and free rotation in the other one of said jaws adjacent to the head of said screw, the free ends of said jaws being provided with axially aligned frusto-conically shaped holes, a hollow tubular stub shaft for supporting said arm in radially adjusted position on said clamp formed integrally with one end of said arm and having a screw-threaded interior portion with relatively axially offset frusto-conical exterior face portions adapted to be seated in said aligned frusto-conical holes in the free ends of said jaws when said arm is rotatively secured to said clamp, and a headed second screw extending through an opening in one of said jaws into threaded engagement with said threaded interior portion of said stub shaft.

FRANK JOSEPH BLUME.

REFERENCES CITED

The following references are of record in the file of this patent:

UNITED STATES PATENTS

| Number | Name | Date |
| --- | --- | --- |
| 628,714 | Ingersoll | July 11, 1899 |
| 1,263,560 | Kaufmann | Apr. 23, 1918 |
| 1,731,468 | Lind | Oct. 15, 1929 |